UNITED STATES PATENT OFFICE.

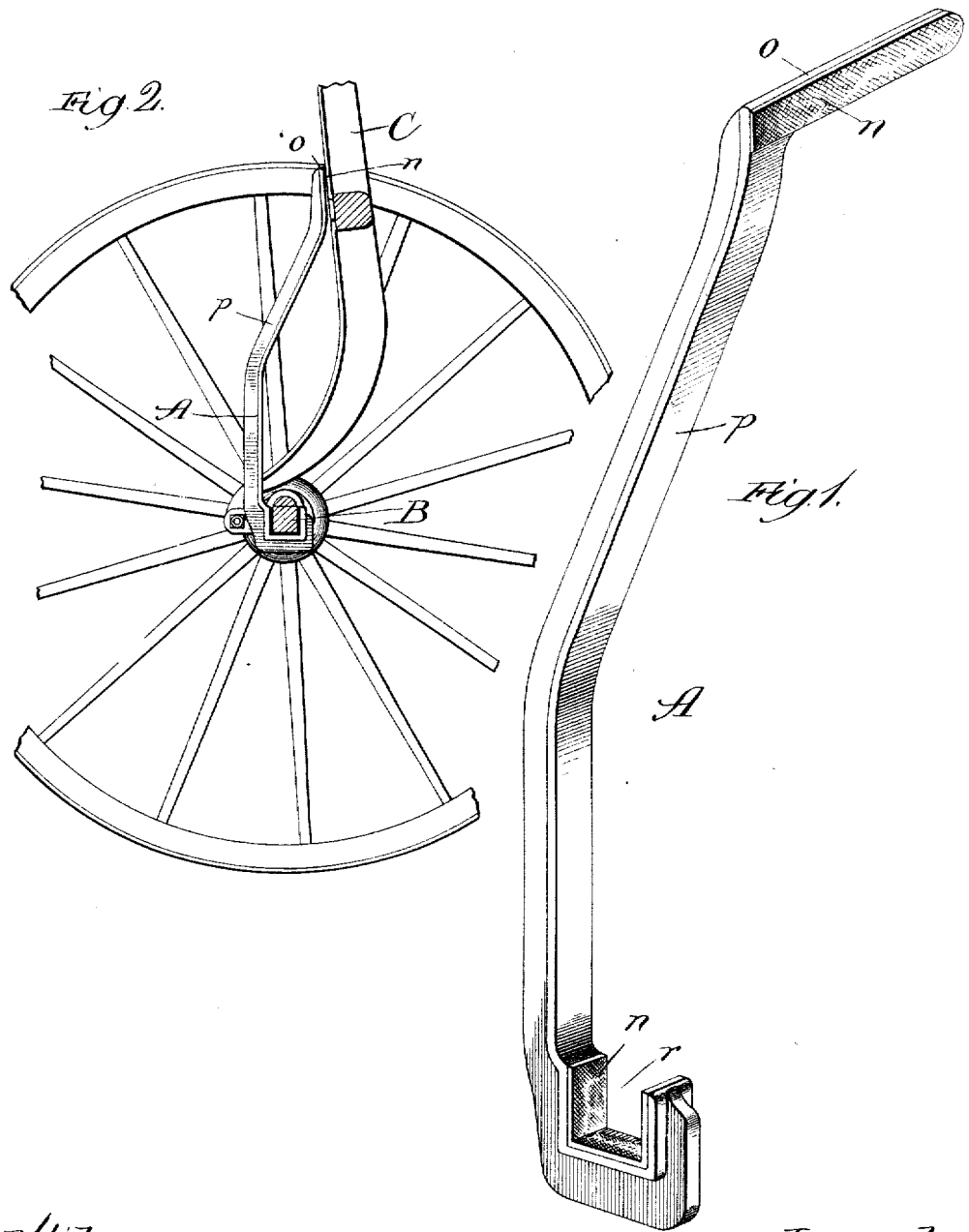

JOHN A. WHEATLEY AND SAMUEL M. WORTHINGTON, OF CHICAGO, ILLINOIS.

VEHICLE-SHAFT SUPPORT.

SPECIFICATION forming part of Letters Patent No. 525,125, dated August 28, 1894.

Application filed May 17, 1894. Serial No. 511,600. (No model.)

*To all whom it may concern:*

Be it known that we, JOHN A. WHEATLEY and SAMUEL M. WORTHINGTON, citizens of the United States, residing at Chicago, in the county of Cook and State of Illinois, have invented a new and useful Improvement in Vehicle-Shaft Supports, of which the following is a specification.

The shafts of a wagon, buggy or other vehicle, when the latter is out of use, or housed or stored in the barn take up considerable room, if allowed to hang and rest on the floor, besides being then liable to injury. To prevent this it is quite common to prop them by any convenient means, the most usual being a strip of board, or brace, extending from the floor to the shafts, or their cross-piece, to prop them in elevated position.

The object of our invention is to provide an improved support for the shafts in raised position, which support shall be readily applicable to the shafts from the vehicle and be secured in place by the weight of the shafts upon it, besides being simple and of inexpensive construction.

Referring to the accompanying drawings:—Figure 1 shows our improved shaft-support in operative position on the axle and shafts of a vehicle; and Fig. 2 is an enlarged perspective view of the support.

A is the support, which we prefer to form of metal, and as a malleable casting. It comprises a socket $r$ at one end, conforming in shape to the cross-section of the axle B to which it is applied and which should snugly fit the axle; a shank-portion or arm $p$, which should be bent as shown to prevent it from aligning throughout its length with the socket; and a bearing-finger $o$ for the shaft, extending at a right angle to the shank from the end thereof opposite that provided with the socket $r$. Both the socket and the bearing side of the finger should be respectively lined and faced with some suitable cushioning material $n$, such as leather, felt, or the like, to afford non-abrading bearing-surfaces for the parts with which they are brought into contact when the support is in operative position.

To employ our improved support the shafts C are raised, preferably as high as possible, the socket $r$ is applied to the axle B adjacent to one of the wheels and its finger $o$ is in position to cause one of the shafts, on being released, to bear against it. The weight of the shafts thus bears continually against the finger $o$, thereby tending to bind the socket $r$ the more against the axle; so that even though the socket be wider than the axle in cross-section, the shaft-engagement with the support will tend to hold it in its operative position.

As will be observed, on reference to Fig. 1 of the drawings, the socket $r$ opens upward, requiring it to be applied to the axle from underneath. This feature of the construction is very material inasmuch as thereby the removal of the support from the vehicle may be automatic, in the sense that, say, in backing a horse into the shafts, on merely raising them to take their sustaining weight off the support, the latter drops by its own weight off the axle, thus avoiding any necessity for resorting to the trouble and inconvenience of requiring an operator to reach for and remove it by hand.

While two of our improved supports may be employed one for each shaft of a pair, when the supports should be right and left with relation to the direction of extension of their fingers $o$, one is sufficient. And, as will be seen, while it is utterly simple in its construction and affords an inexpensive article, it is thoroughly effective and reliable for its purpose.

What we claim as new, and desire to secure by Letters Patent, is—

1. A vehicle-shaft support, comprising an arm having at one end a socket open at its upper end to engage the axle from underneath, and at its opposite end a finger affording a shaft-bearing, substantially as described.

2. A vehicle-shaft support, comprising an arm having at one end a socket open at its upper end to engage the axle from underneath and provided with a cushion-lining, and at its opposite end a finger having a cushion-facing and affording a shaft-bearing, substantially as described.

3. A vehicle-shaft support, comprising the bent arm $p$ having at one end a socket $r$ open at its upper end to engage the axle from underneath, and at its opposite end a finger $o$ affording a shaft-bearing, substantially as described.

JOHN A. WHEATLEY.
SAMUEL M. WORTHINGTON.

In presence of—
M. J. Frost,
W. U. Williams.